(12) United States Patent
Deans

(10) Patent No.: US 10,071,409 B2
(45) Date of Patent: Sep. 11, 2018

(54) TOOLING SYSTEM FOR AND METHOD OF MANUFACTURING DECORATING NOZZLES

(71) Applicant: Terence Keith Deans, Cleethorpes (GB)

(72) Inventor: Terence Keith Deans, Cleethorpes (GB)

( * ) Notice: Subject to any disclaimer, the term of this patent is extended or adjusted under 35 U.S.C. 154(b) by 113 days.

(21) Appl. No.: 15/099,645

(22) Filed: Apr. 15, 2016

(65) Prior Publication Data

US 2016/0303634 A1 Oct. 20, 2016

(30) Foreign Application Priority Data

Apr. 19, 2015 (GB) .................................. 1506604.6

(51) Int. Cl.
| | |
|---|---|
| *B21D 22/16* | (2006.01) |
| *A23P 1/12* | (2006.01) |
| *A23P 1/08* | (2006.01) |
| *B21D 53/00* | (2006.01) |
| *A23G 3/34* | (2006.01) |

(52) U.S. Cl.
CPC ........... *B21D 22/16* (2013.01); *A23G 3/0021* (2013.01); *A23G 3/0097* (2013.01); *A23P 1/085* (2013.01); *A23P 1/12* (2013.01); *B21D 53/00* (2013.01)

(58) Field of Classification Search
CPC ........ B21D 22/14; B21D 22/16; B21D 22/18; B21D 22/185
See application file for complete search history.

(56) References Cited

U.S. PATENT DOCUMENTS

| | | | | |
|---|---|---|---|---|
| 3,072,086 A | * | 1/1963 | Birchfield | B21D 22/16 72/124 |
| 6,532,786 B1 | * | 3/2003 | Luttgeharm | B21D 22/16 72/115 |
| 2004/0226333 A1 | * | 11/2004 | Kato | B21D 22/16 72/68 |
| 2013/0152652 A1 | * | 6/2013 | Allwood | B21D 22/16 72/85 |
| 2015/0202677 A1 | * | 7/2015 | Ogishi | B21D 22/18 72/19.1 |

\* cited by examiner

*Primary Examiner* — Teresa M Ekiert
(74) *Attorney, Agent, or Firm* — Maine Cernota & Rardin

(57) ABSTRACT

Disclosed is a tool set for use in forming the components of a decorating nozzle from sheet metal. A tool-mounting plate mountable on the headstock of a metalworking lathe is configured with concentric grooves into which circular ribs on the tools can locate. Transverse formations prevent relative rotation between the tool and the tool-mounting plate. A method of forming nozzles comprises rolling a metal blank onto the surface of a forming tool as the tool is rotated in the lathe. Successive tools are used to achieve the desired shape.

6 Claims, 15 Drawing Sheets

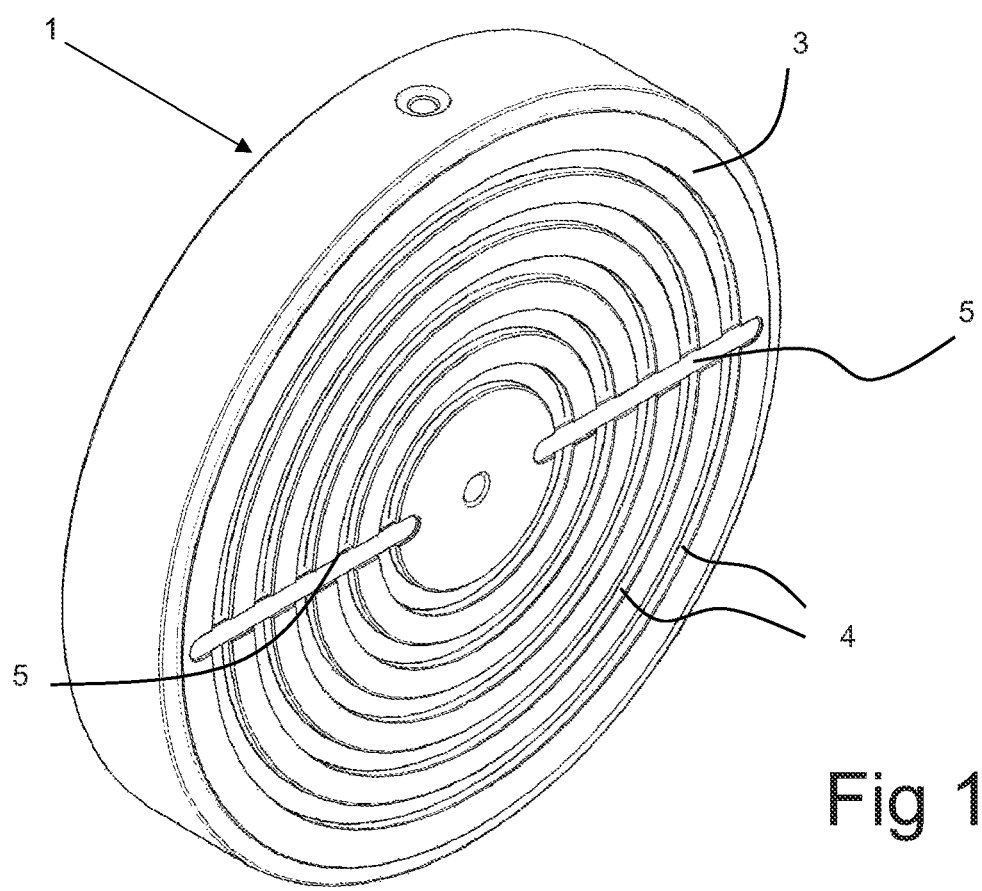

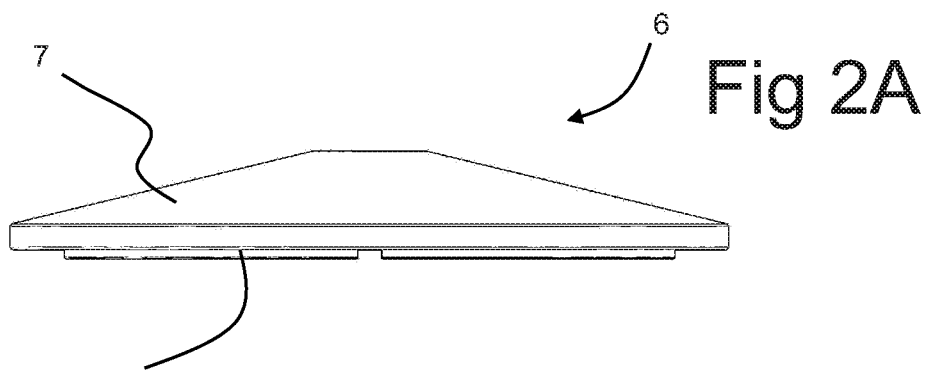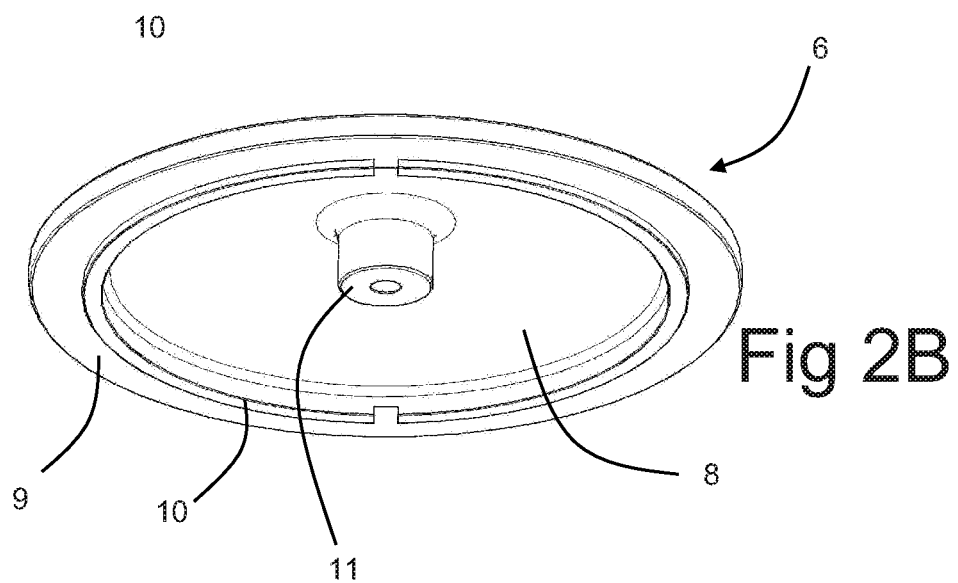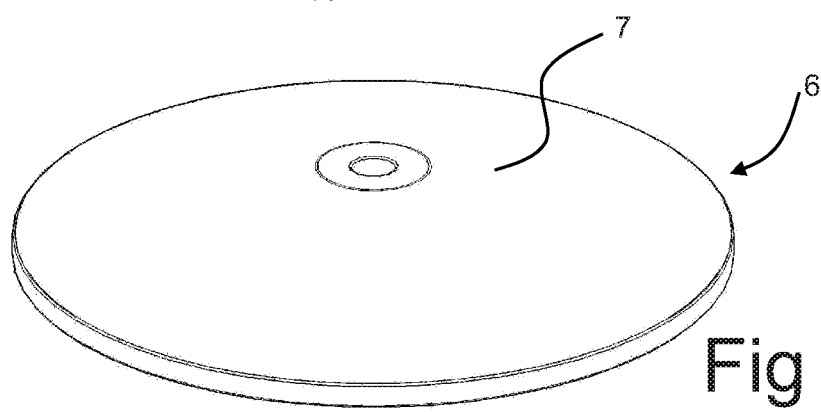

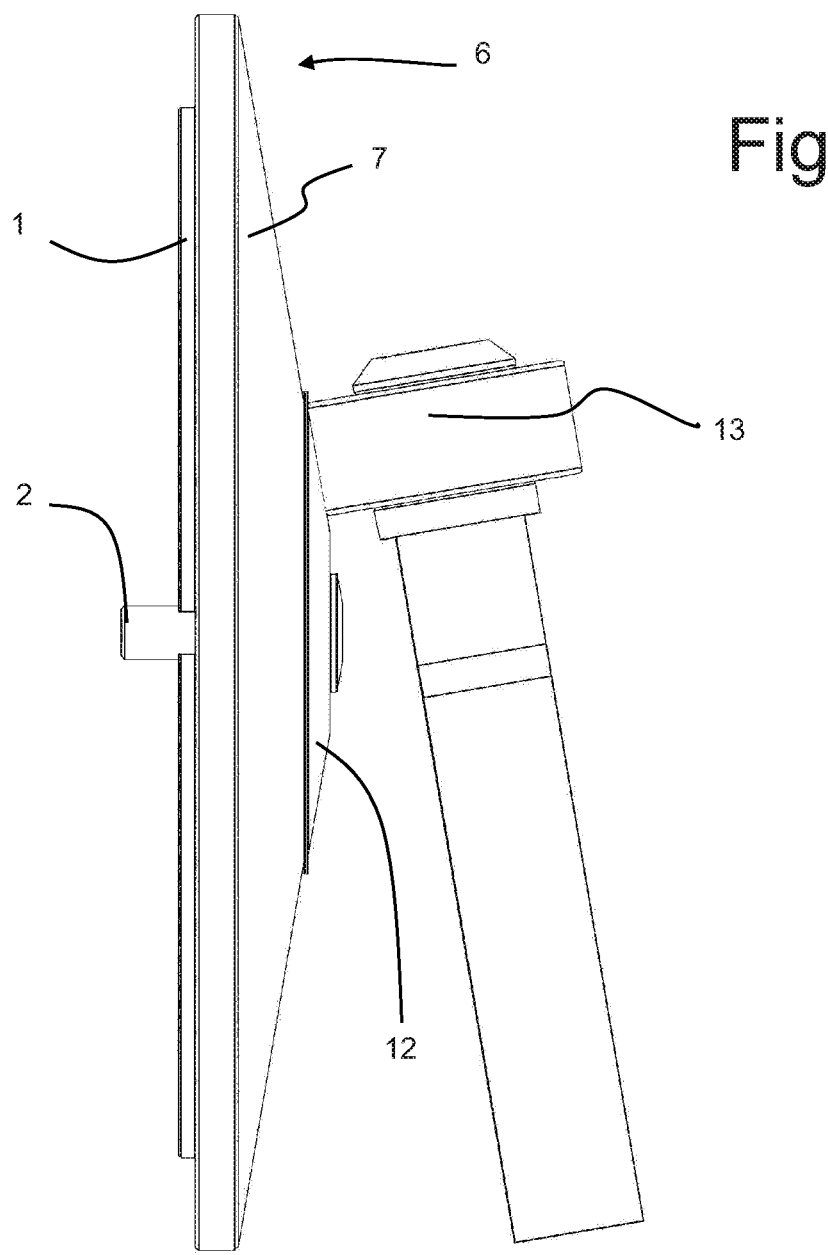

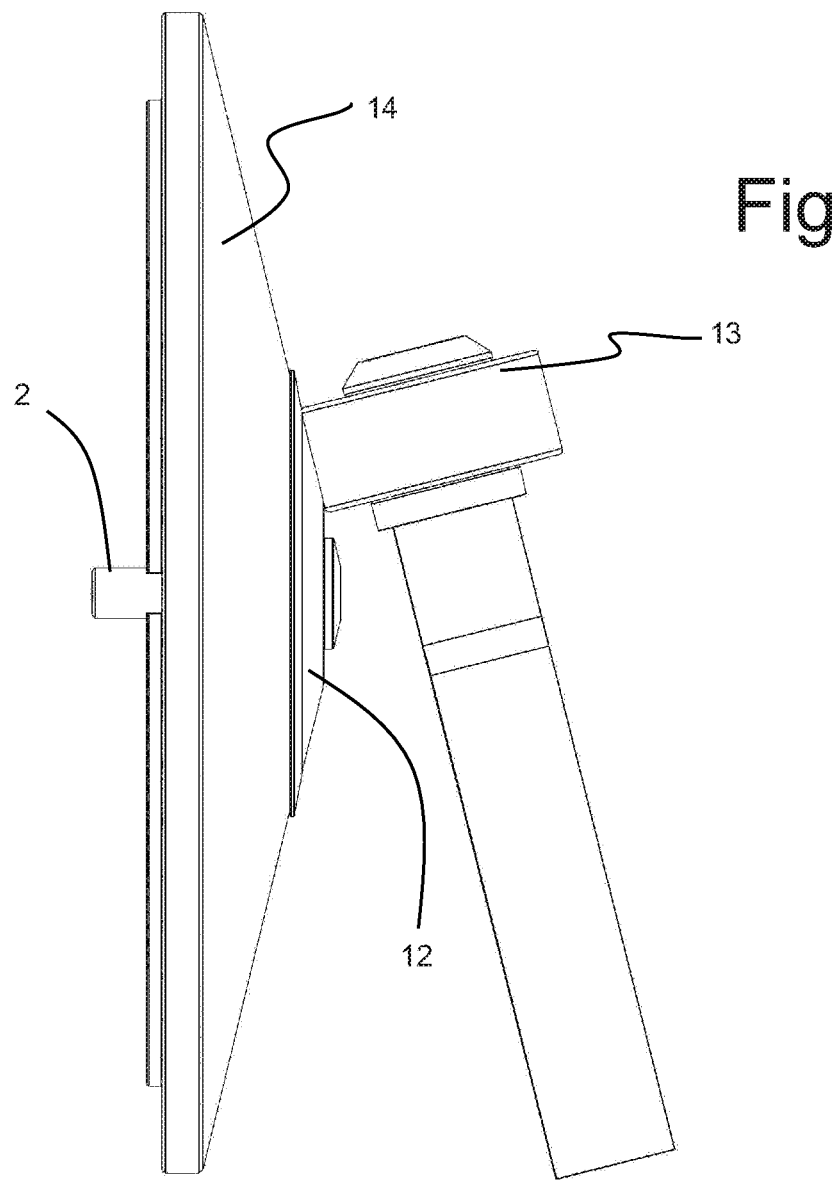

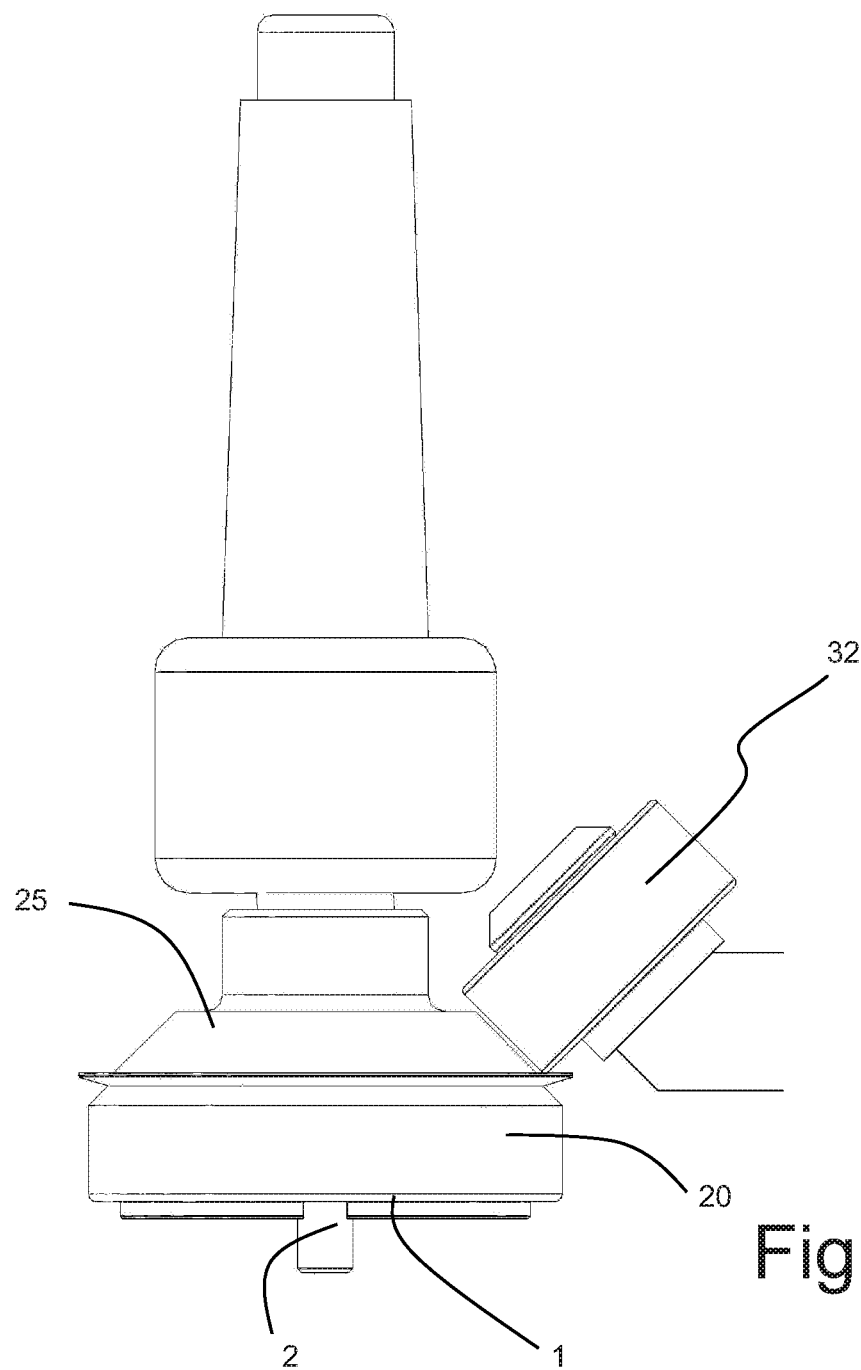

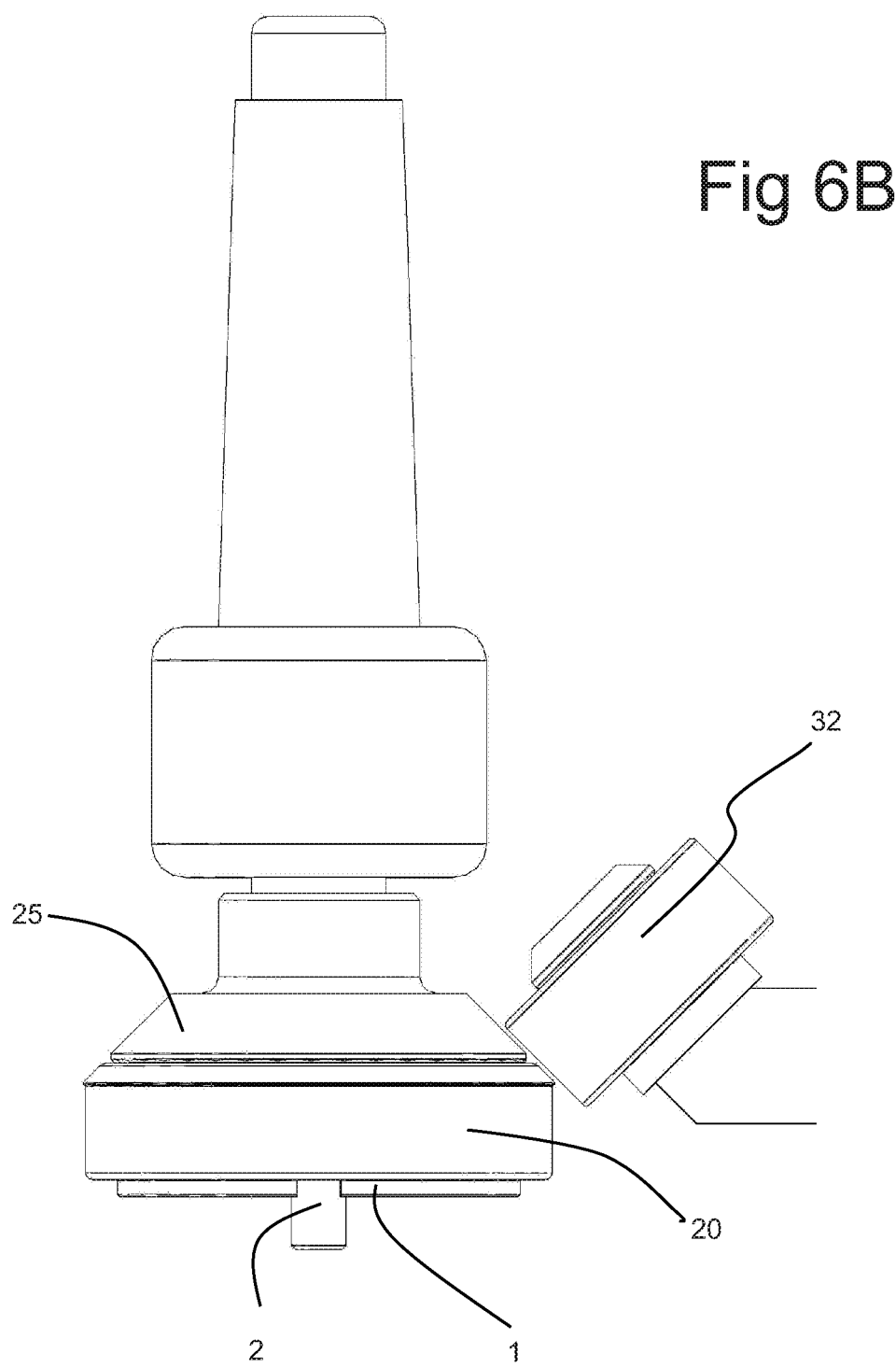

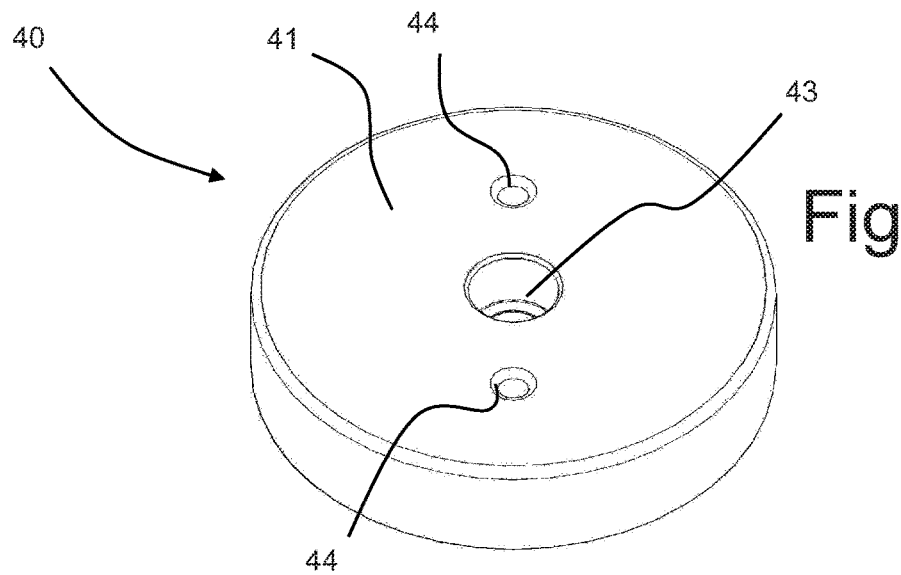
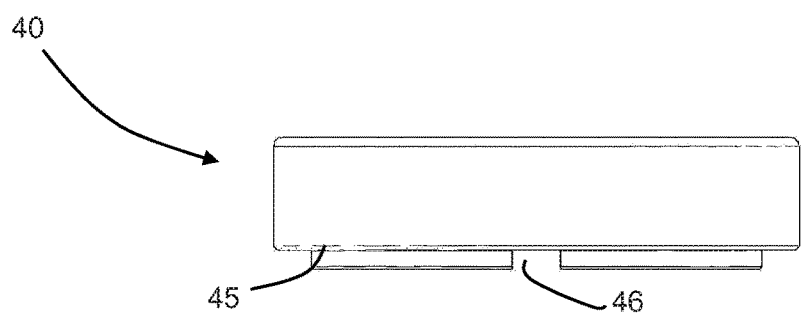
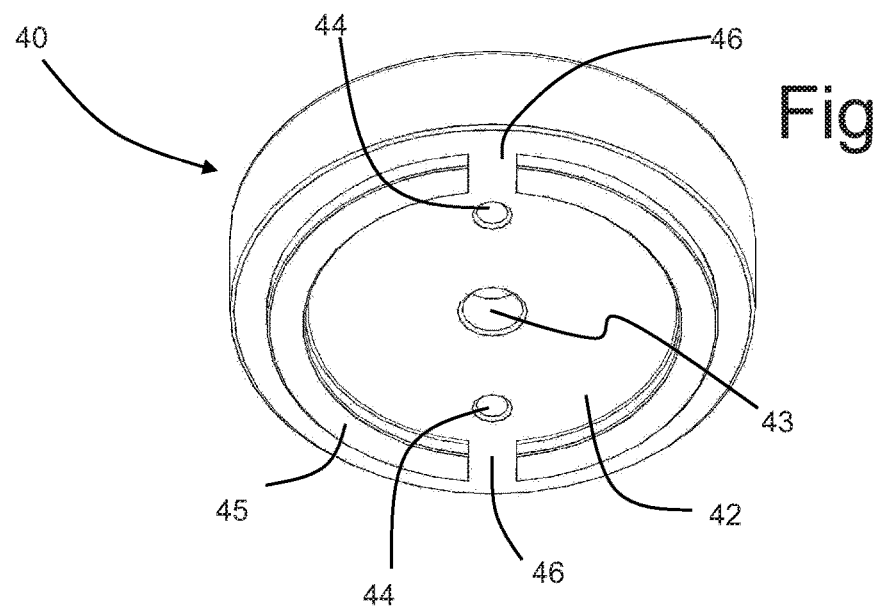

TOOLING SYSTEM FOR AND METHOD OF MANUFACTURING DECORATING NOZZLES

RELATED APPLICATIONS

This application claims the benefit of GB Application No. GB1506604.6, filed Apr. 19, 2015. This application is herein incorporated by reference in its entirety for all purposes.

FIELD OF THE INVENTION

The invention relates to a tooling system for and method of manufacturing decorating nozzles for example for use in the food industry.

BACKGROUND OF THE INVENTION

Decorating nozzles are used in the food industry for dispensing semi-liquid foodstuffs into containers to leave a decorative appearance on the upper surface. A decorating nozzle typically comprises a concave top plate having a central opening to which a connector is attached for connection to the supply line for the material to be dispensed. The top plate is connected to a bottom plate via a surrounding mounting ring. The bottom plate is typically flat and has a plurality of dispensing tubes depending downwardly therefrom and opening therethrough, the tubes usually being provided with a decoratively-shaped opening at the lower end to form the material dispensed therethrough. For example, the openings may be of generally star-shaped configuration.

Different materials and processes require different-sized nozzles and different configurations of dispensing tubes, for example a large number of small-diameter tubes or a smaller number of larger-diameter tubes. Forming the components of the nozzle as pressings is very costly, because a press tool has to be manufactured for each different diameter of nozzle and the number of any one size of nozzle required is not high. It is therefore an object of the invention to provide a more economical and flexible method of manufacture of the nozzles.

SUMMARY OF THE INVENTION

These and other objects of the invention are achieved in one aspect of the invention by a tool set for use in forming a decorating nozzle, which comprises a tool-mounting plate mountable on the headstock of a metalworking lathe, the tool-mounting plate having a face with a plurality of concentric grooves provided therein. A first circular forming tool has on a first face an up-standing ring which is an interference fit in one of said concentric grooves in the face of the tool-mounting plate, a first radially-extending formation on the face of the tool-mounting plate co-operating with a second radially-extending formation on the first face of the tool to prevent relative rotation of the tool and tool-mounting plate when fitted together, the tool having a second face opposite to the first face, the second face having a convex formation thereon and a centrally-located detachable mounting for receiving and securing a circular sheet metal workpiece having a mounting hole at the center thereof. A freely-rotatable roller is carried on a spindle and is co-operable with the first circular tool to engage and deform the workpiece into conformity with first tool as the first tool and the workpiece are rotated.

The tool set may further comprise at least one further forming tool mountable on the tool-mounting plate in place of the first tool for the conduct of successive deforming operations to achieve successively greater deformation of the workpiece. The tool set may further comprise at least one additional tool co-operable with said at least one further forming tool to clamp a workpiece for further forming operations. The at least one additional tool can be mounted on a rotating center in the tail stock of a metalworking lathe.

The invention also provides a method of making a nozzle top for a decorating nozzle, comprising:

a. cutting a disc of sheet metal;
b. providing a first convex forming tool mounted for rotation about an axis through the center of the tool;
c. mounting the disc on said forming tool for rotation therewith;
d. rotating the forming tool and disc;
e. pressing a roller on to the disc adjacent to the center of the disc and tangentially to the rotating surface thereof; and
f. progressively moving the roller outwardly while continuing to press the roller on to the disc to deform the disc to adopt the shape of the convex forming tool.

The method may further comprise repeating steps c. to f. using a second convex forming tool having a greater convex depth than said first forming tool to increase the convex depth of the nozzle top. The method may then further comprise repeating steps a. to f. using a third convex forming tool having a greater convex depth than said second forming tool to further increase the convex depth of the nozzle top.

A preferred method further comprises a finishing step before securing the nozzle top to a nozzle bottom plate, said finishing step comprising:

g. locating the nozzle top between a fourth forming tool and a fifth forming tool, the fourth and fifth forming tools being of circular plan and having opposed end faces respectively configured to hold the nozzle top between them with a portion of the nozzle top extending beyond the fourth and fifth forming tools, the fourth forming tool being provided with a frusto-conical surface on the periphery thereof extending outwardly from said end face to an outer cylindrical surface;

h. optionally mounting a roller at an angle such that a rolling surface of the roller conforms with the frusto-conical surface and moving said roller on to the said portion of the nozzle top to deform it into conformity with the frusto-conical surface;

i. mounting said roller at an angle such that the rolling surface thereof conforms with the outer cylindrical surface of the fourth tool; and j. progressively moving said roller away from said frusto-conical surface to deform the remainder of the portion of the nozzle top into conformity with the outer cylindrical surface.

The invention may further provide a method of forming a nozzle bottom plate for a decorating nozzle, comprising:

k. cutting a disc of sheet metal having a thickness n and a diameter m;

l. providing a sixth forming tool having a cylindrical shape with a diameter less than m and mounting the tool for rotation about an axis through the center of the cylinder;

m. providing a seventh forming tool having a cylindrical shape with a diameter approximately 2n greater than that of the sixth forming tool and mounting the tool for rotation about an axis through the center of the cylinder, said axis being aligned with the axis of the sixth forming tool;

n. locating the disc of sheet metal on the face of the sixth forming tool and bringing the seventh forming tool into contact therewith to hold the disc firmly between the sixth and seventh forming tools;

o. mounting a roller with the axis of rotation thereof parallel to the axis of the sixth and seventh tools and gradually moving the roller axially in contact with the disc from the seventh forming tool to-wards the sixth forming tool to deform a peripheral portion of the disc into engagement with the cylindrical surface of the sixth forming tool; and p. separating the sixth and seventh forming tools and removing the nozzle bottom plate from between them.

The present invention has several advantages over current manufacturing methods:

nozzle tooling costs are reduced;

the invention allows the manufacture of a wider range of nozzle sizes;

the wider range of nozzle sizes means that when nozzles are placed next to each other, nozzle dead area issue is reduced;

a greater use of conveyor, indexing track, rotary processor or factory space will be allowed.

BRIEF DESCRIPTION OF THE DRAWINGS

FIG. 1 is an isometric view of a tool-mounting plate forming part of the tool set of the invention.

FIGS. 2A, 2B and 2C are respectively a side elevation, an isometric view from below and an isometric view from above, of a first forming tool.

FIGS. 3A, 3B and 3C are side elevations illustrating three successive basic forming stages for a nozzle top.

FIGS. 6A and 6B are side elevations illustrating two successive finishing stages for the nozzle top.

FIGS. 7A, 7B and 7C are respectively an isometric view from above, a side elevation, and an isometric view from below, of a sixth forming tool.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

The manufacturing procedures for making a batch of 10 nozzles in diameter range of 4-inch 6-inch 8-inch 10-inch & 12-inch giving a total of 100 components will be described.

Figure 3C:
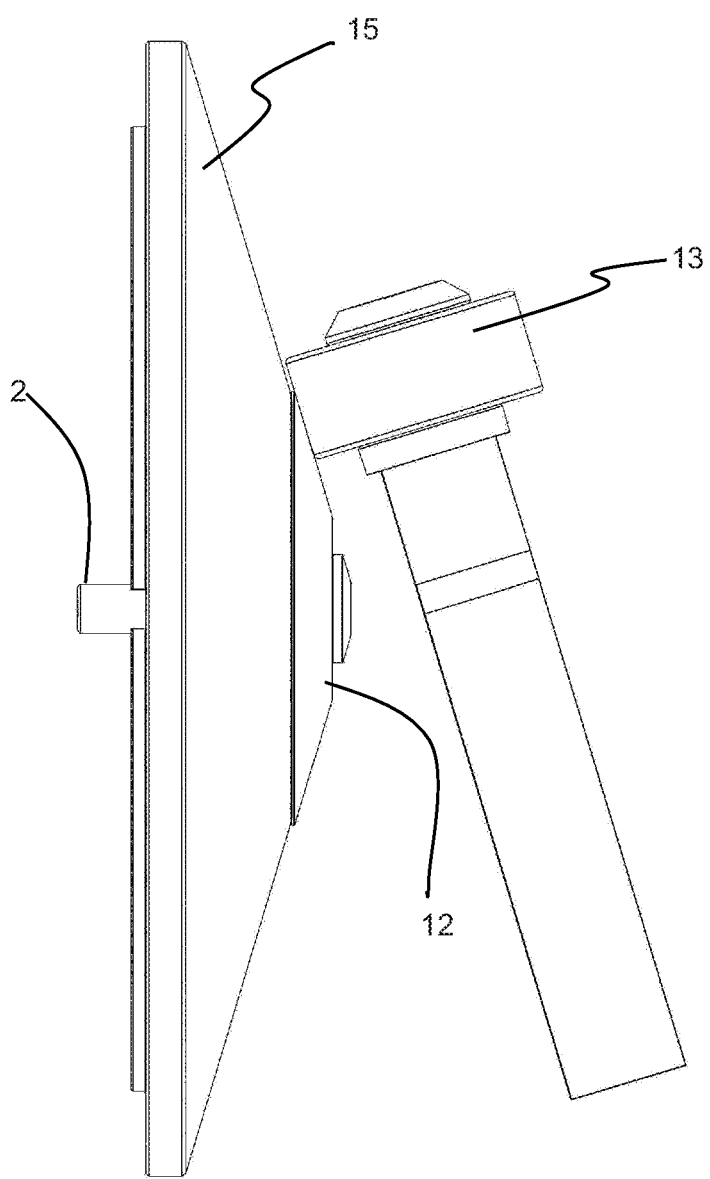

Referring first to FIG. 1, the tool-mounting plate comprises a generally cylindrical member 1 having a central mounting 2 (FIG. 3) which is mountable on the headstock of a standard metal-working lathe, and a face 3 provided with a plurality of concentric grooves 4 for the mounting of tools. A pair of radially-extending ribs 5 extend across the face 3. The mounting plate permits the se-cure mounting of a series of forming tools for use in successive forming stages as hereinafter described.

FIGS. 2A-2C illustrate the first of the forming tools, for use in shaping the frusto-conical nozzle top. Typically, in order to achieve a suitable depth of the frusto-conical shape with a smooth deformation, a series of progressively deeper tools will be used, for example three tools. The tool 6 is in the form of a disc having a frusto-conical outer face 7 and dished opposed inner face 8 with a planar annular rim 9 with an upstanding ring 10 thereon, the ring being shaped to be an interference fit in a respective one of the grooves 4 in the mounting plate 1 (FIG. 1). The dished opposed inner face 8 includes a central boss 11 which provides support, while the cavity serves to give uniform material thickness to reduce distortion. A modified M16 A2 cap screw secures this former to the tool-mounting plate (FIG. 1).

Stage 1 Nozzle Top Forming

In use, referring to FIG. 3A, the tool-mounting plate or ring plate 1 is mounted in the headstock of a metal-working lathe (not shown). The first forming tool 6 is pressed into the ring plate groove using the lathe tail stock to apply the necessary force as it is a transitional fit, securing with the modified M16 A2 cap screw. A disc 12 to be formed into the nozzle top is cut from 18 gauge (18 g) 316 stainless steel sheet (0.0478 inches—1.214 mm—thickness) and provided with a central hole of 24 mm diameter. The disc 12 is mounted on the first forming tool 6 using a M10 cap screw passed through the central hole and engaging a threaded bore provided in the modified M16 A2 cap screw.

The 90 degree roller 13 is set up on the center line and the lathe's compound slide is then set to the same angle as that of the frusto-conical portion of the first forming. The roller is suitably a Timken double row ball bearing with inner and outer races. The compound slide has to be aligned with the angle of the cone to maintain the correct pressure. A DTI gauge is placed on the slide and is moved along the cone, the slide angle being adjusted accordingly.

The roller 13 is set with a feeler gauge at about 95% of the material gauge in this case 18 g. The idea is to trap the bearing so the race is kept in place as the material is cold formed.

The material and bearing support are oiled and then the bearing is positioned and tension applied at the bearing support just before the material starts. With a fine feed on the compound slide the bearing is moved across the face of the material to deform it into conformity with the shape of the forming tool.

Conveniently, a number of blanks will be produced in the same manner with the first forming tool installed. These can be of different sizes, because the first forming tool is sized to be usable for a range of sizes of nozzle top, from the smallest, say 4 inches diameter, to the largest, say 12 inches diameter.

The first forming tool 6 is then removed; this has to be 'levered off' via the step at the outer edge of the ring plate because of the interference fit in the groove on the tool-mounting plate. A second forming tool 14 (FIG. 3B) of greater depth than the first forming tool 6 is mounted on to the tool-mounting plate 1 and the procedure is repeated to deform the nozzle top blank into conformity with it.

The second forming tool 14 is removed after all the blanks have been processed and a third forming tool 15 (FIG. 3C) of still greater depth—the final configuration—is mounted on the tool-mounting plate 1 in its place. The procedure is repeated to deform the blanks into their final desired depth.
Stage 2 Nozzle Top Forming. (18 g)

Figure 4A:
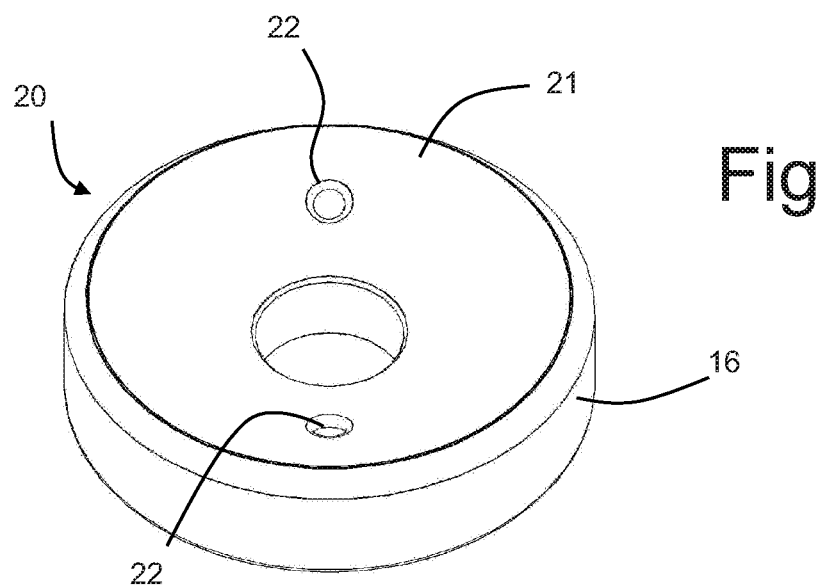
FIGS. 4A, 4B and 4C are respectively an isometric view from above, a side elevation, and an isometric view from below, of a fourth forming tool.
Figure 4B:
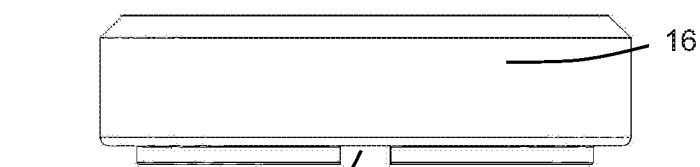
Figure 4C:
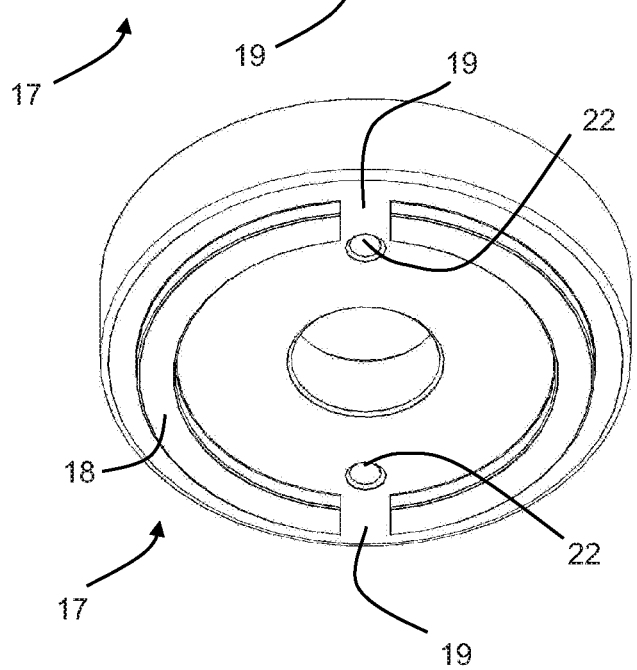
Figure 5A:
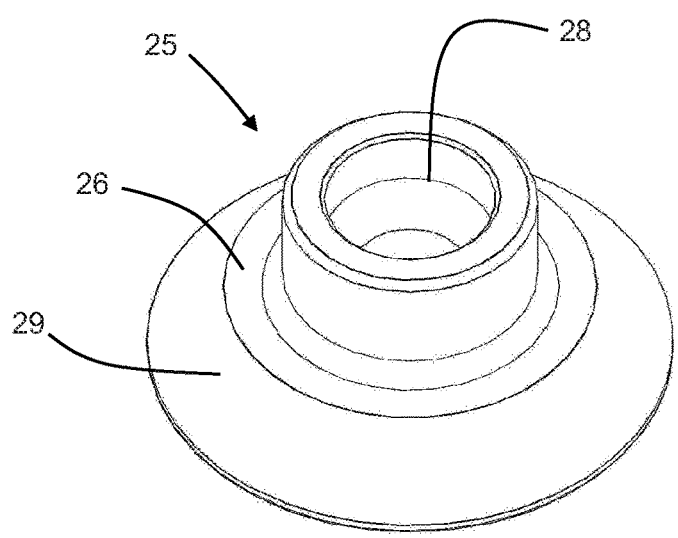
FIGS. 5A, 5B and 5C are respectively an isometric view from above, a side elevation, and an isometric view from below, of a fifth forming tool.
Figure 5B:
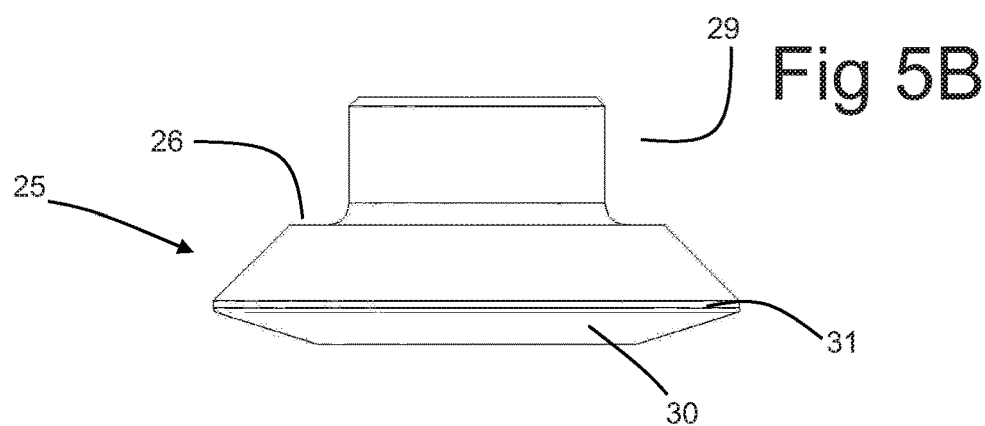
Figure 5C:
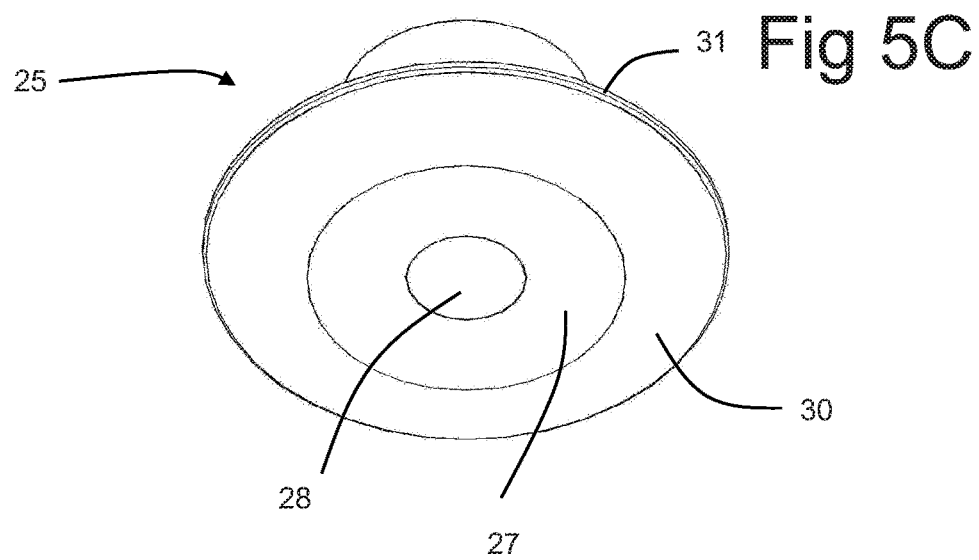

The 4-inch Top former for stage 2—the fourth forming tool 16, as shown in FIGS. 4A-4C—is set up on the ring plate 1; this has to be pressed into the ring plate groove via the lathe tail stock. The fourth forming tool 16 is in the form of an annular member of generally cylindrical form having a first face 17 provided with an upstanding ring 18 interrupted at two diametrically-opposed points to provide gaps 19 for receiving the ribs 5 of the tool-mounting plate 1. A second face 20 opposite to the first face 17 is formed with an annular dished formation 21 corresponding to the frusto-conical shape of the nozzle top so that the nozzle top blank may be seated firmly against it. Two diametrically-opposed threaded holes 22 pass through the tool 16 to facilitate detachment of the tool from the tool-mounting plate, as hereinafter described. The M16 A2 cap screw is then fitted to locate the blank. Note the stage two formers are only retained on the ring plate by the transitional fit into the ring plate grooves. The 4-inch Top clamp—the fifth forming tool 25, as shown in FIGS. 5A-5C—is then set up on a 40 mm rotating lathe center in the tail stock of a metalworking lathe. This fifth tool 25 has two opposed planar faces 26 and 27 with a mounting hole 28 extending between them. One face 26 has around its periphery a frusto-conical section 29 whose surface at any given section makes an angle of approximately 45 degrees with the planar surface 26. The opposed face 27 has around its periphery a frusto-conical section 30 extending in the opposite direction and corresponding to the external surface of the nozzle top. The two sections 29 and 30 meet in a narrow cylindrical rim 31.

The first 4-inch part-formed blank is located on the M16 A2 cap screw head (diameter 24 mm) and trapped in position with the top clamp applying pressure via the tailstock and rotating center.

The 45 degree bearing tool 32 is set up on the center line as hereinbefore explained and the compound slide of the lathe is set to the same angle as the stage 2 tool, the angle being adjusted precisely as hereinbefore described.

The 90 degree bearing tool is then set up in the next tool post slot.

A standard lathe tool is set up in the next tool post slot. Using the standard lathe tool, the outside diameter of the blank is trimmed and chamfered, the diameter being adjusted so the final form is at the correct size.

The material and bearing support or top clamp are then oiled, and the 90 degree bearing tool is used to push the edge over to 90 deg. (optional).

The 45 degree bearing 32 is positioned at the top clamp just before the material starts and tension is applied to the bearing. The top clamp is designed to be at the right diameter to apply the correct amount of tension to trap the bearing and form the material. With a fine feed on the compound slide the bearing is moved across the face of the material from the position shown in FIG. 6A to the position shown in FIG. 6B. The trapped 'nozzle top' is then re-leased via the tail stock of the lathe.

These steps are then repeated on the remaining 4-inch part-formed blanks.

The next step is to remove the 4-inch Top former stage 2—the fourth forming tool 20; this has to be extracted from the ring plate groove via two M10 HT grub screws screwed into threaded holes 22.

Other sizes of stage 2 formers, as illustrated in FIG. 6, can then be in-stalled and the second stage forming step repeated for the other sizes of nozzle top. The M16 A2 locating cap screw is then removed. This completes the second stage of top forming.
Nozzle Bottom Plate Forming A 4-inch bottom plate forming tool 40—the sixth forming tool, as illustrated in FIGS. 7A-7C, is located on the plate 1; this has to be pressed into the ring plate groove via the lathe tail stock as it is a transitional fit. The sixth forming tool 40 is in the form of a cylindrical disc having first and second opposed circular faces 41 and 42 with a mounting hole 43 extending between them. Two diametrically-opposed threaded holes 44 pass through the tool 40 to facilitate detachment of the tool from the tool-mounting plate 1 after use. The face 42 is provided with an upstanding ring 45 interrupted at two diametrically-opposed points to provide gaps 46 for receiving the ribs 5 of the tool-mounting plate 1. The M16 A2 cap screw is used to secure the forming tool.

Figure 8A:
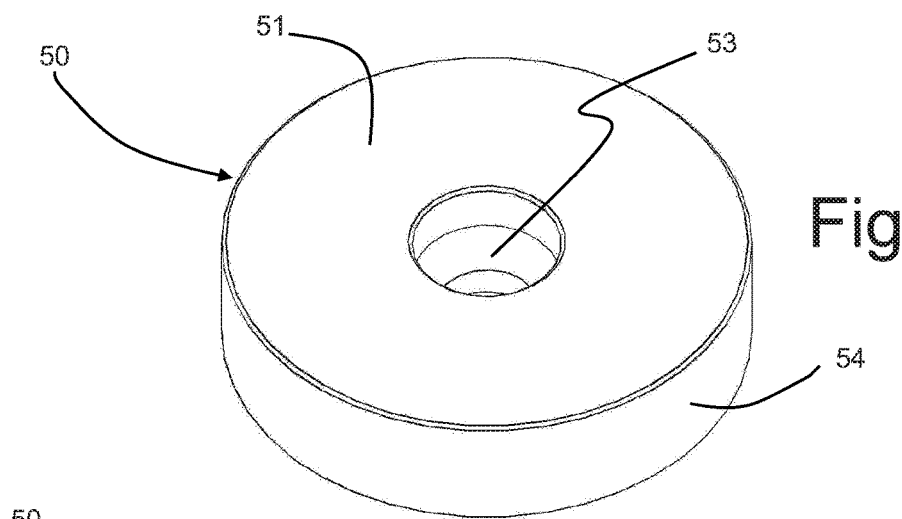
FIGS. 8A, 8B and 8C are respectively isometric views from above and below, and side elevation, of a seventh forming tool.
Figure 8B:
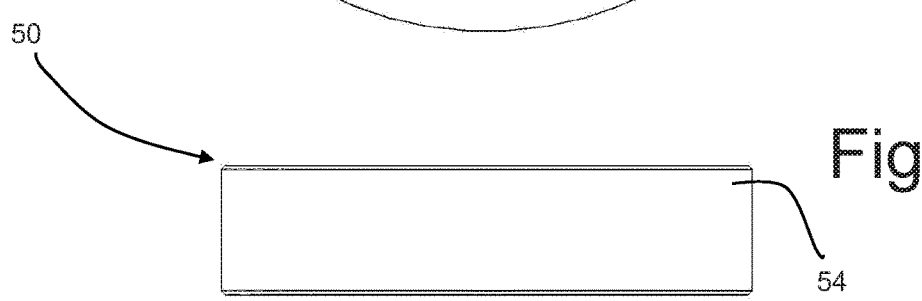
Figure 8C:
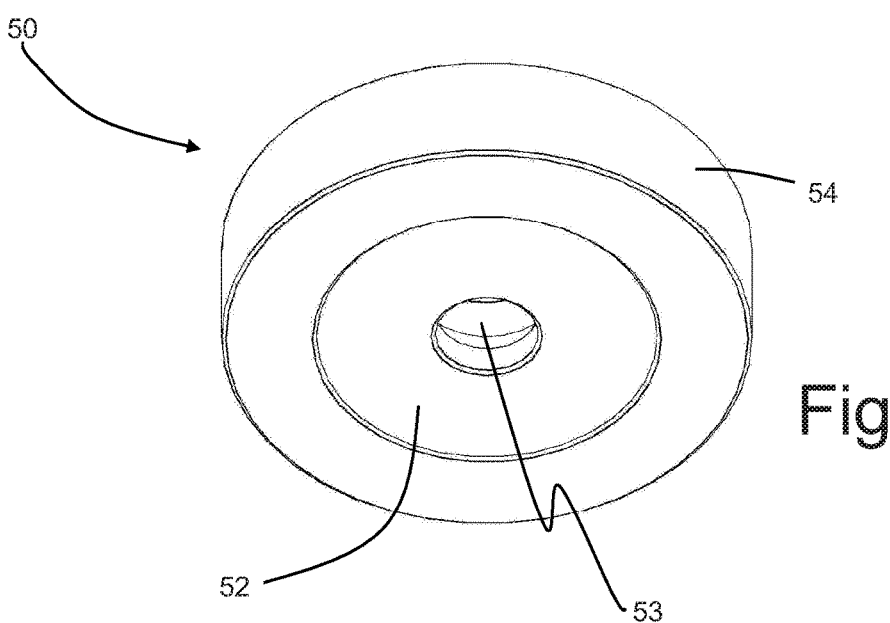
Figure 9A:
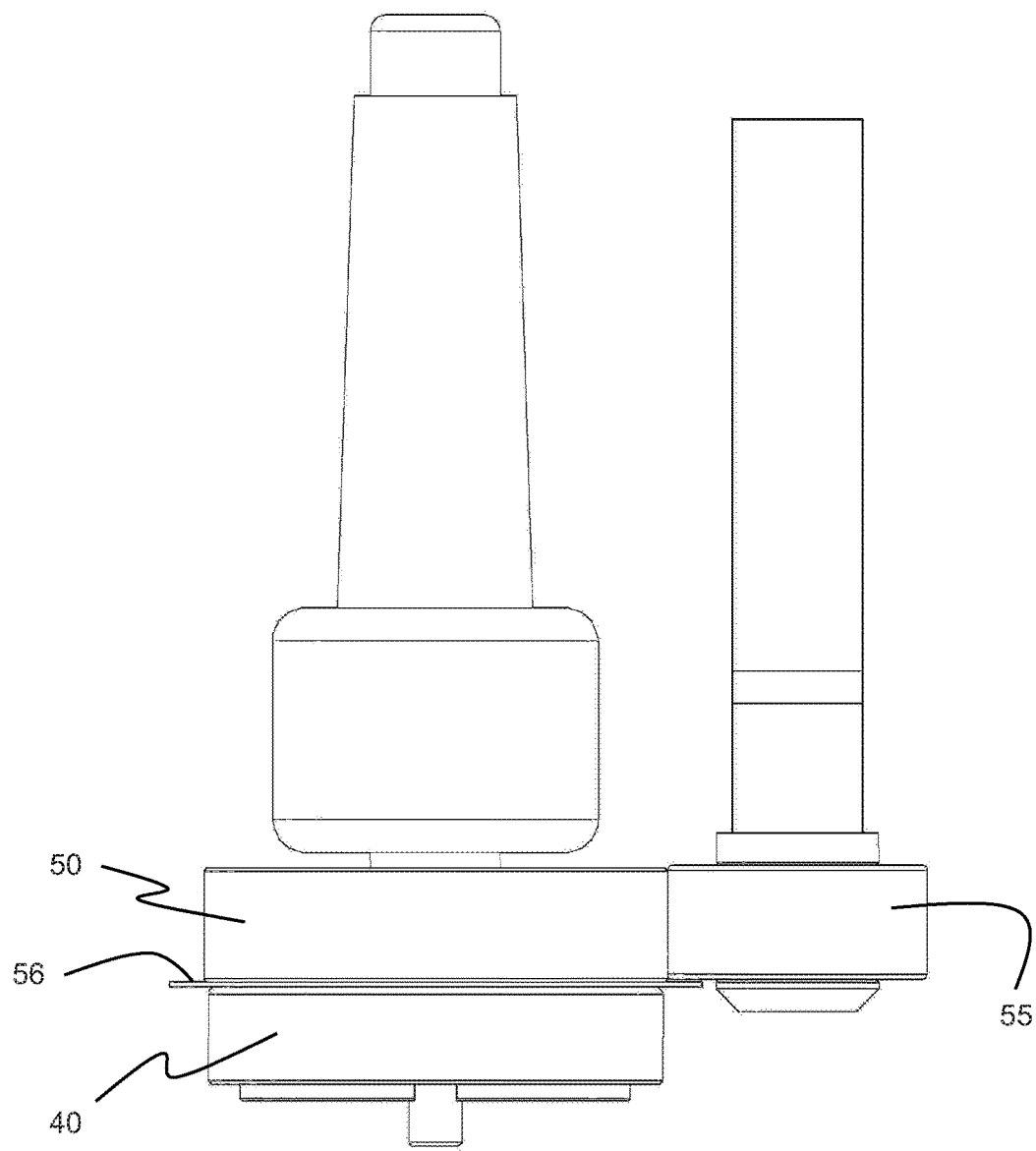
FIGS. 9A and 9B are side elevations illustrating two successive stages in the formation of the nozzle bottom plate.
Figure 9B:
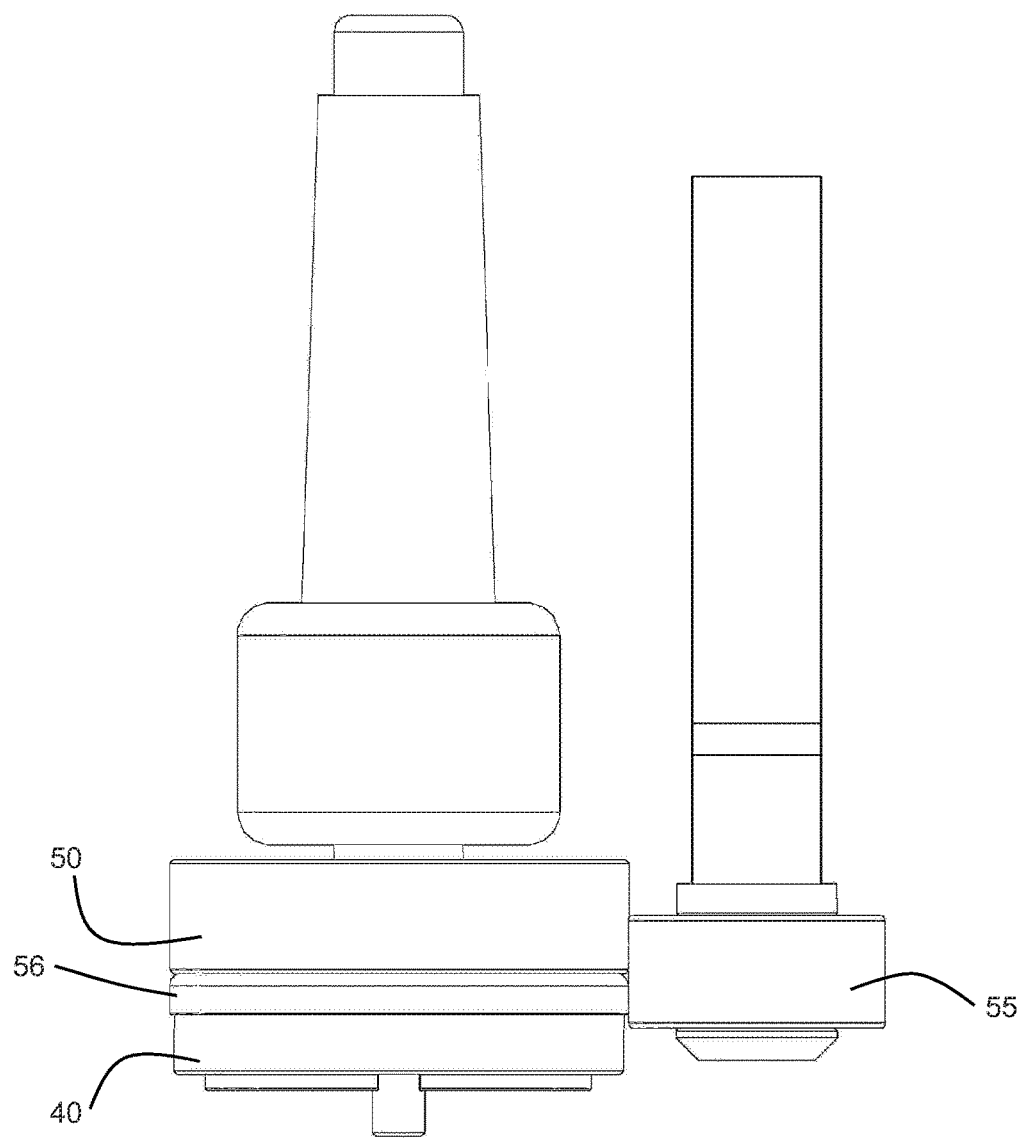

A 4-inch bottom plate clamp 50—the seventh forming tool, as illustrated in FIGS. 8A-8C, is located on a 40 mm rotating lathe center in the tail stock. The seventh forming tool 50 comprises a cylindrical disc having opposed generally planar faces 51 and 52, with a central hole 53 extending between them. A small chamfered edge 54 surrounds the second face 52. The sixth forming tool 40 has a diameter slightly smaller than that of the seventh forming tool 50, for example approximately two thickness of the sheet steel smaller to allow for the forming of the metal over it. Using the pre-set tools already in the tool post, the compound slide is set so the 90 degree bearing tool is at the same angle as the bottom plate former, (0 degrees). Correct alignment is achieved as herein-before described.

A number of 4-inch bottom plate blanks are cut from 16 Gauge stainless steel (0.00598 inches, 1.519 mm thickness). The first of the blanks is located and trapped in position with the bottom plate clamp applying pressure via the tailstock and rotating center. (A ring can be used to centralize the blank to the tooling.).

A standard lathe tool is set up in the next tool post slot and is used to trim and chamfer the outside diameter of the blank; the diameter should be adjusted so the final form is at the correct size. The material and bearing support or bottom clamp 50 are then oiled.

The 45 degree roller is used to push the edge over to 45 degrees (optional). The 90 degree roller 55 is positioned at the bottom clamp 50 just before the material starts and tension is applied to the bearing. The bottom clamp is designed to be at the right diameter to apply the correct amount of tension to trap the bearing and form the material. With a fine feed on the compound slide the bearing is moved across the face of the material. The trapped bottom plate 56 is then released via the tail stock.

These steps are then repeated on the remaining 4-inch blanks.

The 4-inch bottom plate forming tool 40 and clamp 50 can then be re-moved and replaced by a different-sized set to enable other sizes of bottom plate, for example 6-inch diameter or 12-inch diameter, to be installed.

Figure 10:
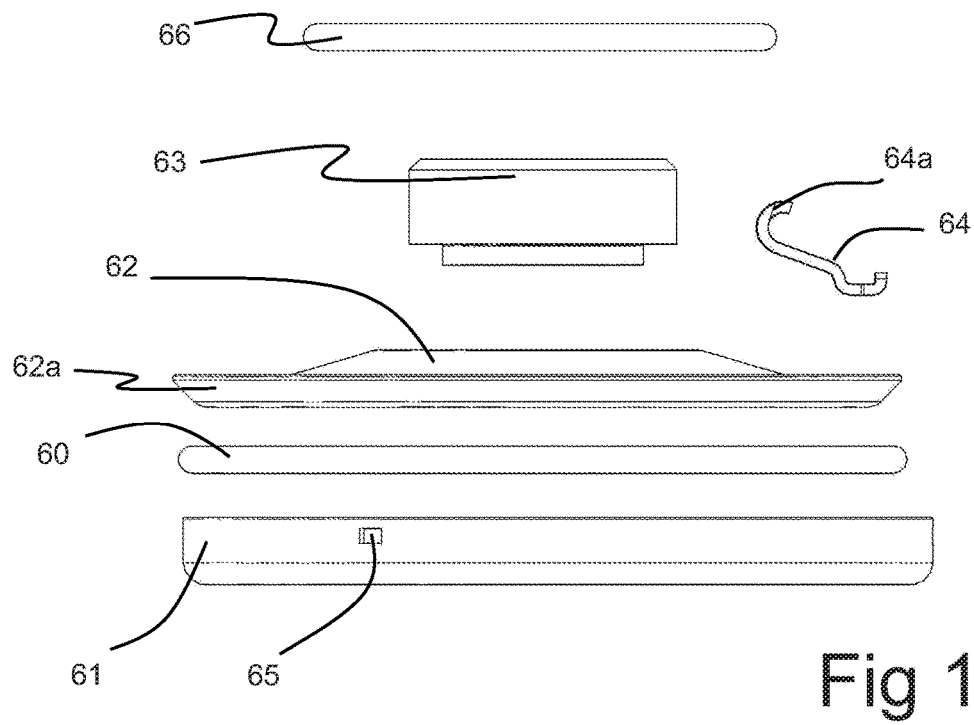
FIG. 10 is an exploded diagram showing the components of the nozzle before assembly.
Figure 11:
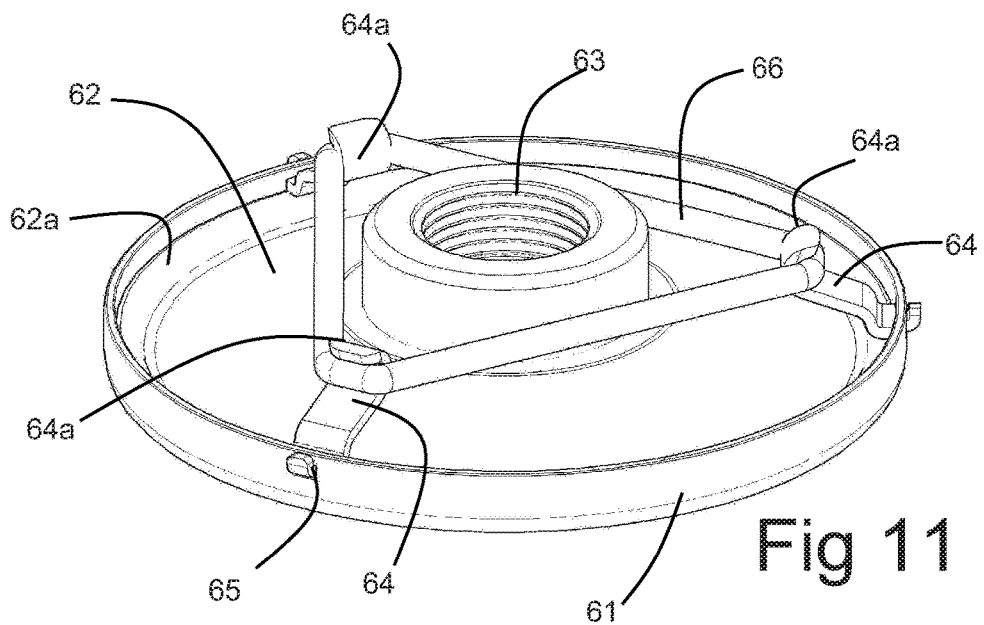
FIG. 11 is an isometric view of the assembled nozzle from above.

With reference to FIG. 10, the nozzle can then be assembled by locating a resilient O-ring 60 within a bottom plate 61 and then seating a nozzle top 62 on to the O-ring 60 such that a 45° peripheral portion 62a of the nozzle top seats against it. An internally-threaded boss 63 is mounted in the central hole of the nozzle top. As may be seen from FIG. 11, clips 64 engage in apertures 65 provided in the periphery of the nozzle bottom 61; in the illustrated embodiment, three equally-spaced clips are provided. A resilient loop 66 is engaged under tension on a hook formation 64a of each of the clips 64 so as to pull the clips 64 into firm engagement with the external upper surface of the nozzle top 62, so compressing the O-ring to form a fluid-tight seal between the nozzle top 62 and the nozzle bottom 61.

Figure 12A:
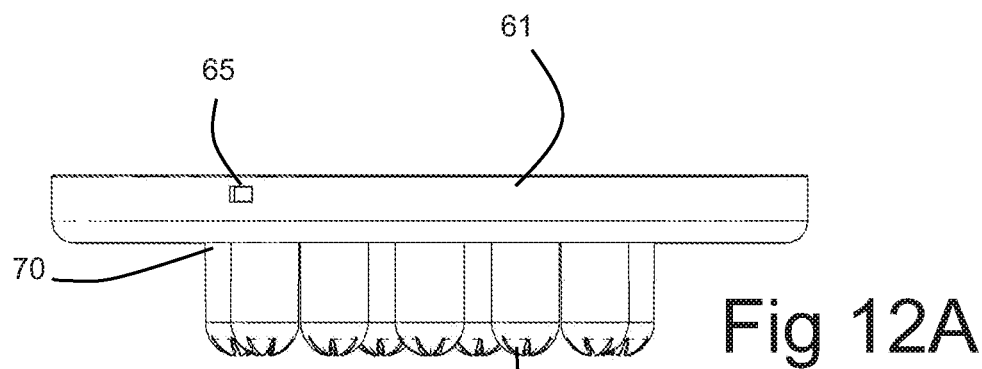
FIGS. 12A and 12B are respectively a side elevation and an isometric view from above of a nozzle bottom plate with dispensing tubes installed.
Figure 12B:
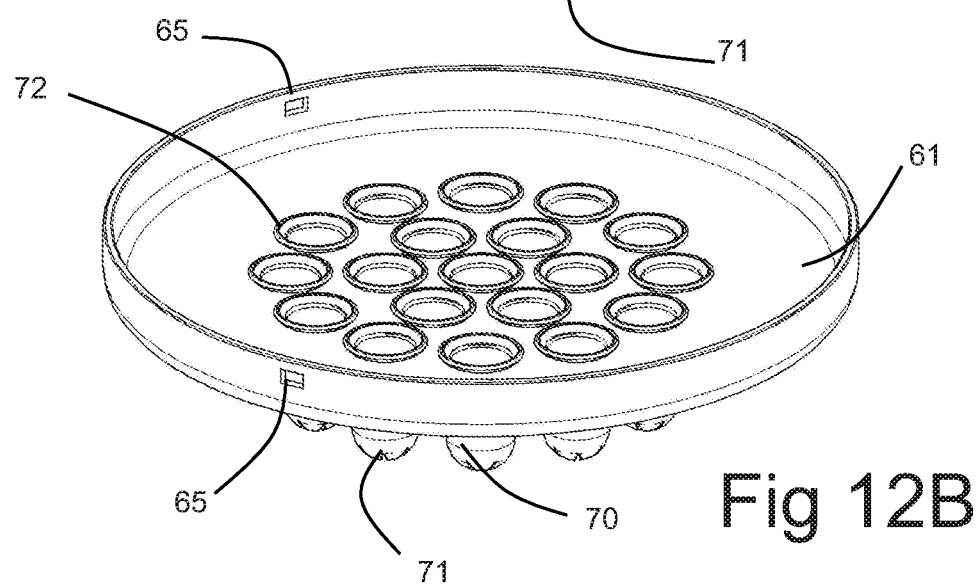

The nozzle bottom 61 may be provided with a plurality of apertures for dispensing fluid products, but will typically have dispensing tubes 70 installed therein, as may be seen from FIGS. 12A and 12B. Each tube is formed with a star-shaped outlet 71 so that the dispensed material adopts a patterned shape. The tubes are fitted into the plate by swaging the end 72 of the tube 70 remote from the outlet 71 on to the plate surrounding a respective fitting hole.

It will be appreciated that a wide variety of apertures and dispensing tubes may be used to achieve different decorative effects, and the invention is not limited to the particular configurations disclosed.

The foregoing description of the embodiments of the invention has been presented for the purposes of illustration and description. It is not intended to be exhaustive or to limit the invention to the precise form disclosed. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method of making a nozzle top for a decorating nozzle, comprising:
   a cutting a disc of sheet stainless steel with a thickness of at least 18 g;
   b providing a first convex forming tool mounted for rotation about an axis through the center of the tool;
   c mounting the disc on said forming tool and clamping a central portion of the disc between a clamping support and said forming tool whereby the disc can rotate with the forming tool and the clamping support;
   d positioning a roller over the clamping support adjacent to the center of the disc and tangentially to the rotating surface thereof at a distance from the surface of the forming tool equal to about 95% of the original thickness of the disc;
   e rotating the forming tool, clamping support and disc about said axis;
   f progressively moving the roller outwardly while maintaining the roller at said distance from the surface of said forming tool of about 95% of the original thickness of the disc to deform the disc to adopt the shape of the convex forming tool;
   g providing a second convex forming tool mounted in place of the first convex forming tool and having a greater convex depth than said first convex forming tool; and
   h repeating steps c to f.

2. The method of claim 1, further comprising:
   g locating the nozzle top between a fourth forming tool and a fifth forming tool, the fourth and the fifth forming tools being of a circular plan and having opposed end faces respectively configured to hold the nozzle top between them with a portion of the nozzle top extending beyond the fourth and the fifth forming tools, the fourth forming tool being provided with a frusto-conical surface on a periphery thereof extending outwardly from the end face to an outer cylindrical surface;
   h mounting a roller at an angle such that a rolling surface of the roller conforms with the frusto-conical surface and moving the roller on to the portion of the nozzle top to deform it into conformity with the frusto-conical surface;
   i mounting the roller at an angle such that the rolling surface thereof conforms with the outer cylindrical surface of the fourth tool; and
   j progressively moving the roller away from the frusto-conical surface to deform a remainder of the portion of the nozzle top into conformity with the outer cylindrical surface.

3. The method of claim 2, wherein the frusto-conical surface of the fourth forming tool forms a solid angle of 45 degrees.

4. The method of claim 1, further comprising the steps of:
   i providing a third convex forming tool mounted in place of the second convex forming tool and having a greater convex depth than said second convex forming tool; and
   j repeating steps c to f.

5. A method of making a nozzle top for a decorating nozzle, comprising:
   a cutting a disc of sheet metal;
   b providing a first convex forming tool mounted for rotation about an axis through the center of the tool;
   c mounting the disc on said forming tool and clamping a central portion of the disc between a clamping support and said forming tool for rotation therewith whereby the disc can rotate with the forming tool and the clamping support;
   d positioning a roller over the clamping support adjacent to the center of the disc and tangentially to the rotating surface thereof at a distance from the surface of the forming tool equal to about 95% of the original thickness of the disc;
   e rotating the forming tool, clamping support and disc about said axis;
   f progressively moving the roller outwardly while maintaining the roller at said distance from the surface of said forming tool of about 95% of the original thickness of the disc to deform the disc to adopt the shape of the convex forming tool;
further comprising:
   g locating the nozzle top between a fourth forming tool and a fifth forming tool, the fourth and fifth forming tools being of circular plan and having opposed end faces respectively configured to hold the nozzle top between them with a portion of the nozzle top extending beyond the fourth and fifth forming tools, the fourth forming tool being provided with a frusto-conical surface on the periphery thereof extending outwardly from said end face to an outer cylindrical surface;
   h mounting a roller at an angle such that a rolling surface of the roller conforms with the frusto-conical surface and moving said roller on to the said portion of the nozzle top to deform it into conformity with the frusto-conical surface;

i mounting said roller at an angle such that the rolling surface thereof conforms with the outer cylindrical surface of the fourth tool; and j progressively moving said roller away from said frusto-conical surface to deform the remainder of the portion of the nozzle top into conformity with the outer cylindrical surface.

6. The method of claim 5, wherein the frusto-conical surface of the fourth forming tool forms a solid angle of 45 degrees.

\* \* \* \* \*